J. J. DANIELS.
AUTOMATIC SAFETY TRAIN CONTROL APPARATUS.
APPLICATION FILED JUNE 24, 1918.
1,323,161.
Patented Nov. 25, 1919.
5 SHEETS—SHEET 2.
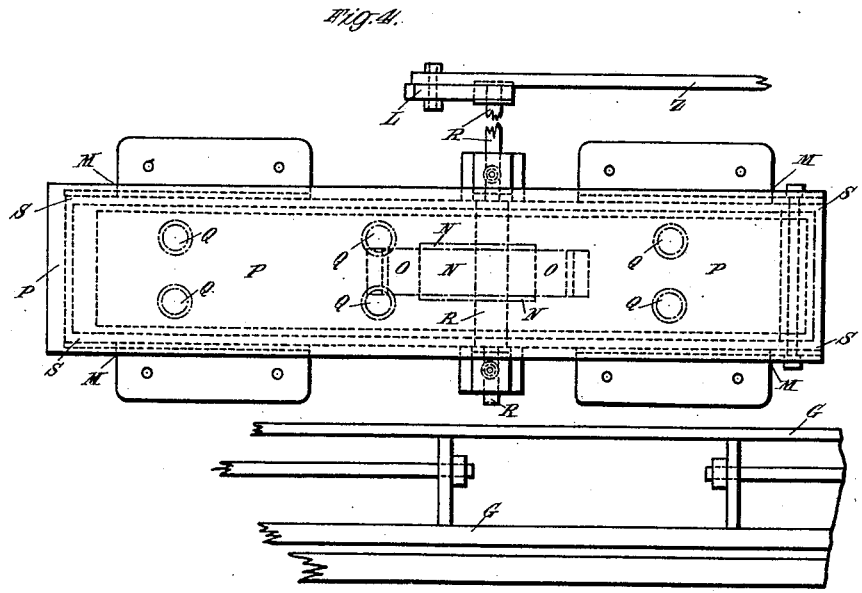
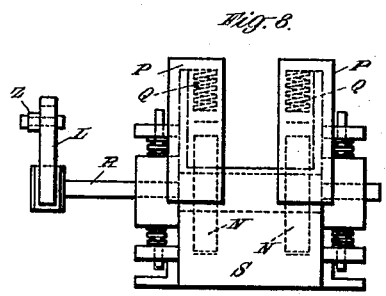

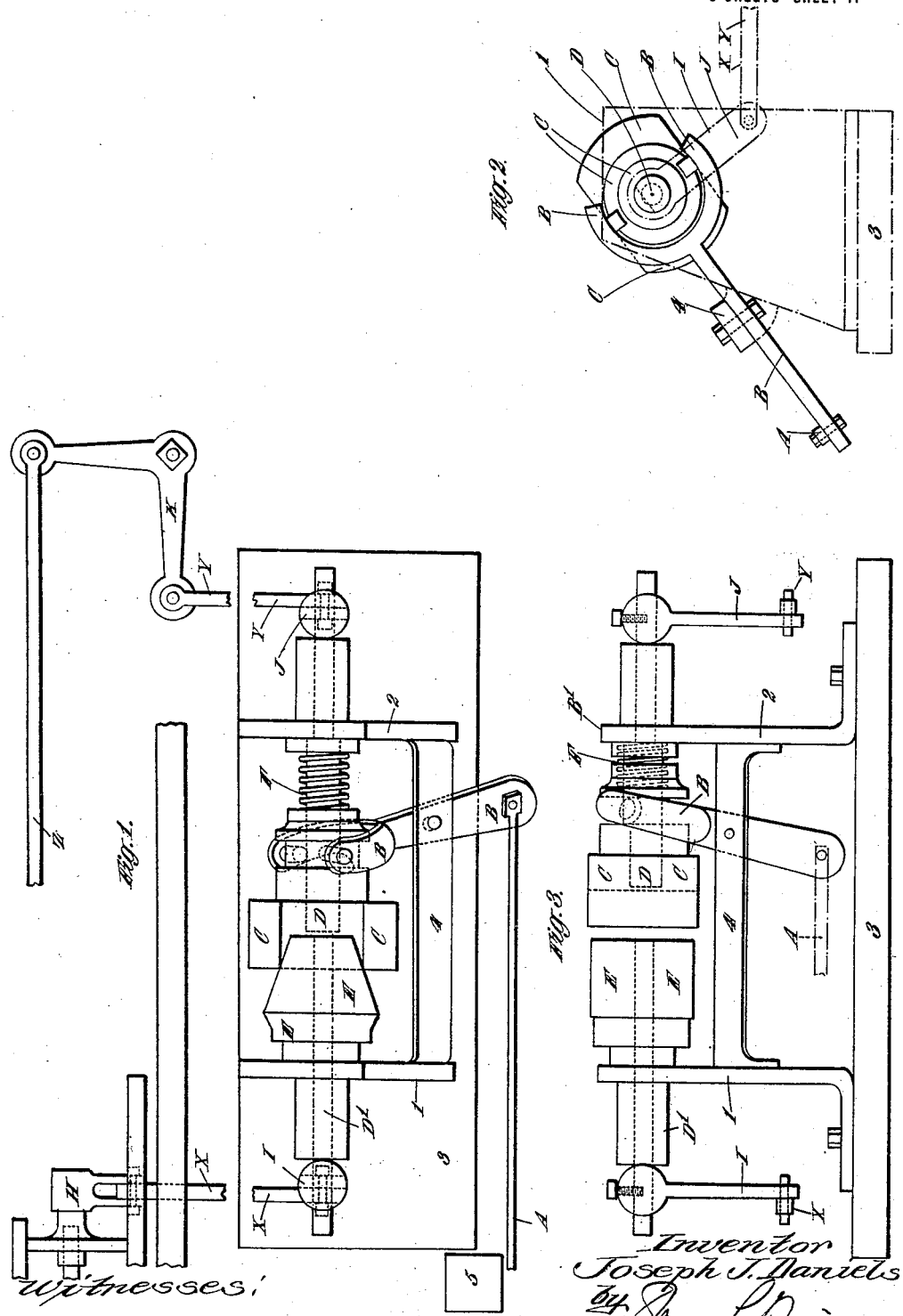

J. J. DANIELS.
AUTOMATIC SAFETY TRAIN CONTROL APPARATUS.
APPLICATION FILED JUNE 24, 1918.
1,323,161.
Patented Nov. 25, 1919.
5 SHEETS—SHEET 3.
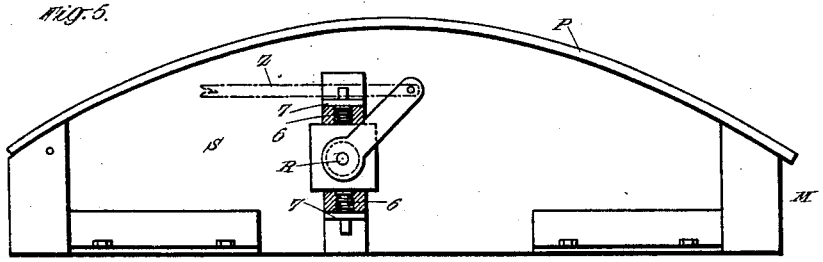
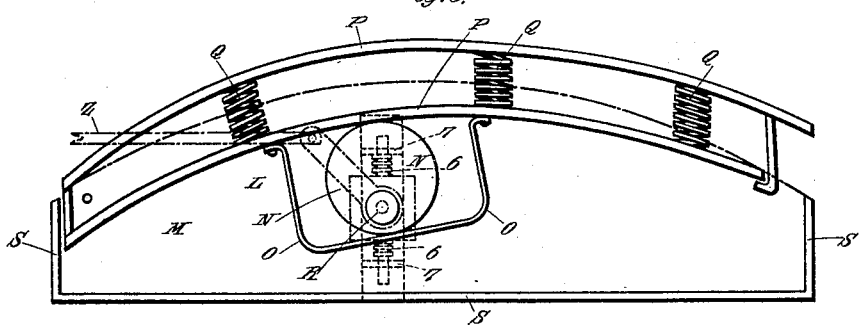
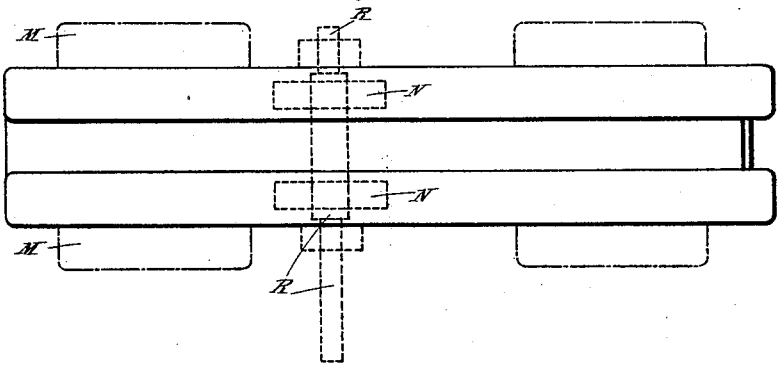

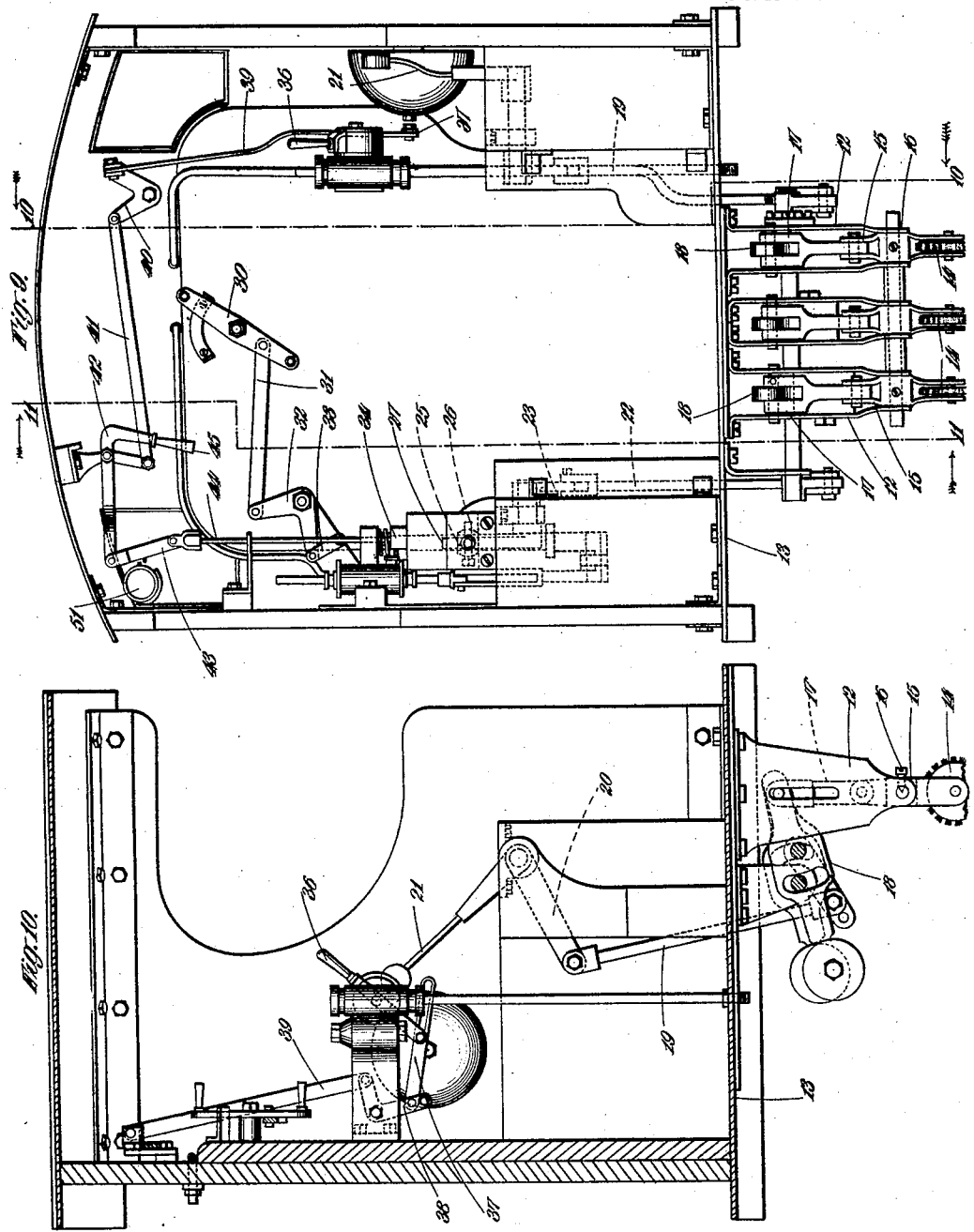

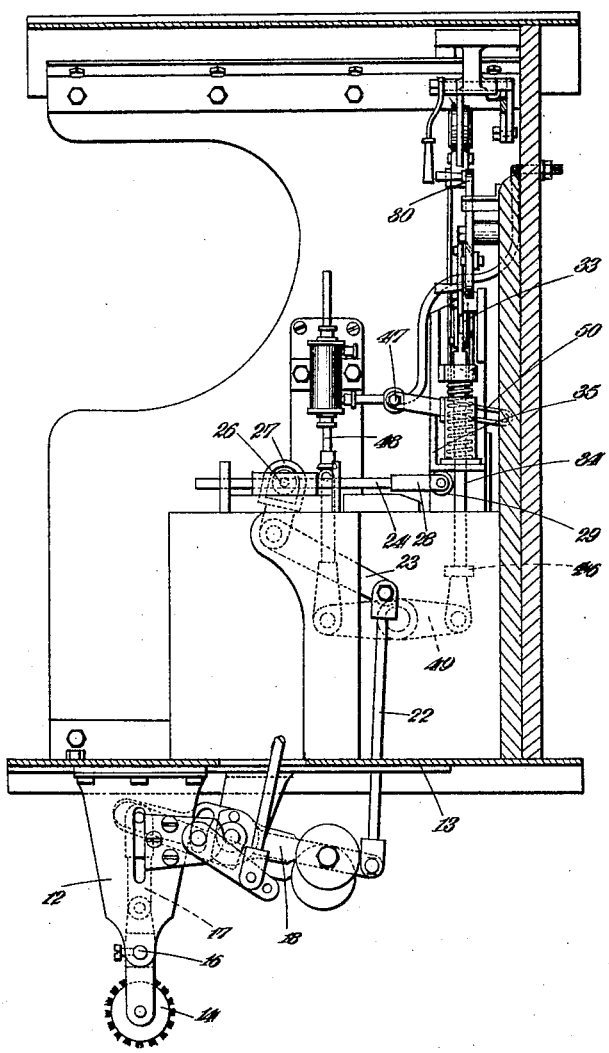

UNITED STATES PATENT OFFICE.

JOSEPH JOHN DANIELS, OF SURBITON, ENGLAND.

AUTOMATIC SAFETY TRAIN-CONTROL APPARATUS.

1,323,161. Specification of Letters Patent. Patented Nov. 25, 1919.

Application filed June 24, 1918. Serial No. 241,553.

*To all whom it may concern:*

Be it known that I, JOSEPH JOHN DANIELS, engineer, a subject of the King of Great Britain, residing at Chediston House, Cranes Park, Surbiton, Surrey, England, have invented certain new and useful Improvements in Automatic Safety Train-Control Apparatus, of which the following is a specification.

This invention relates to automatic safety control apparatus for trains and the like.

Considerable progress has been made during the past few years in devising schemes to eliminate the human element in controlling trains through the medium of the usual running signals and many locking devices, both electrical and mechanical, have been proposed.

In spite of the expenditure to perfect the system of signaling large sums of money are expended annually in providing some duplicating form of signaling during foggy weather and here again we are faced in most cases with the human element.

The objects of this invention are to provide an automatic safety train control device which is simple and inexpensive and which dispenses with fogmen and fog detonators.

To this end, the invention provides improved means whereby, when a signal is at danger and an engine or train should pass that signal, a warning will be given automatically to the driver in his cabin and the engine brought to a standstill, for example by cutting off the power and applying the brakes.

In an automatic safety control apparatus for trains and the like constructed in accordance with this invention, the wheels of the engine or other vehicle depress a rocking bar or the like which, when the signal is at danger, by means of clutch mechanism actuates an intercepter on or near the track which at once rises and operates apparatus affixed to the engine or other vehicle to give a warning to the driver in his cabin and shut off the engine power and apply the brakes the vehicle thereby becoming its own signal indicator.

A simple clutch device is interposed between the abovementioned rocking bar and intercepter, the arrangement being such that when the rocking bar is depressed a rotary motion is given to the clutch to raise the intercepter.

The said clutch is in engagement at all times while the signal is in the "on" or "danger" position.

In order that the invention may be fully understood it will now be described with reference to the accompanying drawings in which Figures 1, 2 and 3 show in plan, end elevation and side elevation respectively one form of clutch mechanism made in accordance with this invention, Figs. 4, 5 and 6 show in plan, side elevation and sectional elevation respectively one of the intercepters, Figs. 7 and 8 show in plan and end elevation respectively another intercepter, and Figs. 9, 10 and 11 show in end and side elevation the apparatus fitted under and in the engine cabin. Fig. 10 being an elevation taken on the line 10—10 of Fig. 9 and looking in the direction of the arrow, and Fig. 11 being an elevation taken on the line 11—11 of Fig. 9 and looking in the direction of the arrow.

The clutch which is preferably fixed in juxtaposition to each signal post consists of two engaging members C and E working on axles D and $D^1$ respectively supported by suitable brackets 1, 2 bolted to the base plate 3. The member C of clutch slides on a squared axle D and has a groove in which the forked lever B engages. A cross piece 4 supports and is bolted to the brackets 1, 2 to which the forked lever B is pivoted.

From the signal connection at the foot of signal post 5, the wire A engages lever B the upper part of which actuates the clutch member C by means of the fork working in the groove.

The member C is held in engagement with the member E by the coil spring F.

The clutch is disengaged simultaneously with the lowering of the signals by the wire A from the fork attachment to the signal connection at foot of post 5.

The depression bar G attached to the rail is connected by means of the lever H and rod X to lever I which actuates the clutch member E; when bar G is depressed by the flange wheel of a vehicle passing over it the clutch member E is given a rotary movement.

When the clutch member C is in engagement with member E this rotary movement is conveyed to the latter which in turn actuates lever J and rod Y actuating bell crank K and rod Z connected to lever L attached to the intercepter M.

The intercepter M is constructed of an oblong metal box or sheath S with a hinged concave metal slope or cover P. On the underside of the cover P the cam or eccentric N works on an axle R bolted through the sides of sheath S and the cover P and cam N are held in engagement by an eccentric strap O.

The intercepter M is preferably placed between the rails in the four foot way, although as a matter of fact it may be placed outside the rails. The motion of the cam N is actuated by lever L bolted to axle R and through the medium of rods Y and Z, this motion lifts slope P the prescribed height to engage the lifting treadles fitted to the engine or other vehicle.

The slope P may be quite plain or it may be fitted in duplicate one above the other with spiral springs Q, or laminated springs, to absorb shock and further shock absorption is provided against by spiral springs 6, 6, suitably mounted in guides 7, 7, below and above axle R of cam N.

In Figs 7 and 8 the intercepters are shown duplicated but both are actuated in similar manner by the one cam axle R.

Referring now to Figs. 9, 10 and 11 the fitting on the engine consists of three pairs of suspension brackets 12, 12, fixed under the foot plate 13, although they may be placed in any other suitable position. The said brackets act as guides and supports to the contact wheels 14, or the like; permitting a pendulum balanced movement actuating in either direction of the vehicle, the lower rods 15 holding the contact wheels or the like on axles 16 at the end of the brackets. A short fork ended connecting rod 17 is attached to upper end of rod 15 and thence to the balanced rocking bars 18, which in turn give the upward movement to the rod 19 and crank 20 to the striker 21 and to the rod 22 crank 23 and trigger gear 24 all in the cab of vehicle.

Within the cab the striker 21 is operated by the two outer contact wheels 14, and the middle wheel and its connection actuate the trigger gear 24 actuating the power brake and engine regulator, either or both.

The trigger 24, consists of a rod having a slot 25 formed therein and through which extends the slotted end 27 of the crank 23, the latter being retained in the slot 25 by pin 26. The forward end of the rod is formed with an extension 28 fitted with runners or rollers 29.

The lever 30 for turning on or cutting off the power is connected by rod 31 to bell crank 32 which is connected by link 33 to rod 34. A stop 46 is fixed to rod 34. A spring pressed plunger 35 is arranged around said rod 34 and is adapted to co-act with the stop 46.

The brake lever 36 is also connected to the plunger 34 through slotted link 37, bell crank 38, rod 39, bell crank 40, rod 41, bell crank 42, link 43 and rod 44 passing through a guide. Crank 42 is fitted with an additional hand lever 45 for the purpose hereafter described.

In the normal position the plunger 35 is raised and held away from the stop 46 by means of the trigger extension 28 extending underneath so that the levers 30 and 36 can be operated independently.

When the trigger 24 is withdrawn by the movement of the middle contact wheel 14, the plunger 35 is forced down on to the stop 46 and forces automatically the stop 46 down as well, at the same time operating the levers 30 and 36 through the various connections.

The engine is thus brought to a standstill and the levers 30 and 36 become locked. In order to reset the trigger the hand lever 45 is moved in the direction of the arrow to raise up the plunger 35 for the trigger to slide underneath.

As the hand lever 45 is moved the indicator 51 is operated to record such movement.

The weight of the balanced rocking bar 18 tends always to urge the trigger 24 in its forward or shot position.

In order to aid the plunger in its downward movement steam or vacuum may be employed, for example, a slotted link 50 may be connected thereto and adapted to operate the cock 47 and allow steam or vacuum to force down the piston rod 48 which is connected to the rod 34 through rocking lever 49.

In the preferred form the duplicated slopes P, P, are fitted at the distance signal and actuate the warning lever, while at the stop signal one slope is fitted to actuate the power cut off and brake levers.

In operation, suppose for example that an engine driver passes the distant signal at danger the intercepter fitted near that post being of course raised, the outside treadles 14, on the engine will contact with the said intercepter and the levers connected thereto will be operated to strike the bell in the cabin and give warning to the driver. Now if by any chance the driver does not hear the bell and passes the stop signal while at danger, the middle treadle will contact with the intercepter and the rod 22 and lever 23 will be operated and the train brought to rest.

Should a distant and stop signal be on the same signal post the automatic indication will be separately given for each signal similarly to when installed on separate signal posts.

Where splitting signals are installed, this device will still give an indication for each signal.

Should single line working be put into force on a double track fitted with this invention, the freeing of the gear for wrong line working is provided for by locking the lever B with set screw or the like.

The invention will give reliable protection in the case of bay road sidings converging on to running lines.

In the case of broken wires the apparatus remains engaged as though the signals were in the "on" or danger position, and this applies equally in the case of signals that may defectively hang off or signals that have not come off to the predetermined angle.

The pull on the signal levers is infinitesimal as the signalman is merely called upon to insert or withdraw a simple clutch contrivance.

Engine vibration or oscillation has no effect on the efficiency and reliability of the apparatus, the clutch and intercepters being closed in so that ice, snow and the like leaves the working of the device unimpaired.

Instead of the lever operating the striker of the warning, the striker may be mounted on a toothed wheel which is caused to rotate by a rack released by the said lever. With this arrangement a prolonged sound will be given instead of a single sound. The rack may be connected to the lever so that when the power is turned on it is raised to its operative position. A spring or weight may be attached to the rack to cause it to fall or move.

Apparatus made in accordance with this invention is particularly adaptable to busy electrified suburban lines where a regular and frequent service of trains is required to be maintained under adverse conditions such as fog or falling snow, smoking tunnels and cuttings. The engine driver is given a clear indication at each "distant" signal by means of a bell or whistle when such signal is in the "on" position and at all "stop" signals in the "on" position, an application of the brakes and the power cut off will be automatically effected to stop the train if the signal is passed.

Apparatus as described may be used in mines, quarries and the like where trolleys are used.

It is not desired to limit the invention by providing intercepters to give both a warning and to stop the train. Either may be employed.

What I claim is:—

1. An automatic safety control apparatus for railway vehicles and the like comprising, in combination, clutch mechanism actuated by the vehicle, signal controlling means for controlling the engagement of said clutch mechanism, a controlling device operated by said clutch mechanism when the latter is engaged, and apparatus on the vehicle adapted to coöperate with and be controlled by said controlling device when the latter has been operated by said clutch mechanism.

2. An automatic safety control apparatus for railway vehicles and the like comprising, in combination, a signal wire, clutch mechanism connected with said signal wire and actuated by the vehicle, a controlling device operated by said clutch mechanism, and apparatus on the vehicle adapted to coöperate with and be controlled by said controlling device when the latter has been operated by said clutch mechanism.

3. An automatic safety control apparatus for railway vehicles and the like comprising, in combination, a clutch, signal controlled means for controlling the engagement of said clutch, a member adapted to be depressed by the vehicle, said member being operatively connected with said clutch to rotate the latter, one or more intercepters operated by said clutch when the latter is engaged and rotated, and one or more contact members on said vehicle adapted to engage and be actuated by said intercepters when the latter have been operated by said clutch.

4. An automatic safety control apparatus for railway vehicles and the like comprising, in combination, a signal wire, a clutch connected to said signal wire, a rocking bar adapted to be depressed by the vehicle, said rocking bar being operatively connected with said clutch to rotate the latter, one or more intercepters operated by said clutch, and one or more contact members on said vehicle adapted to engage and be actuated by said intercepters when the latter have been operated by said clutch.

5. An automatic safety control apparatus for railway vehicles and the like comprising, in combination, a normally engaged clutch, a signal controlled clutch shifter for disengaging said clutch, a member actuated by the vehicle, said member being operatively connected with one of the elements of said clutch to actuate the same, one or more intercepters connected with and operated by the other element of said clutch, and one or more contact members on said vehicle adapted to engage and be actuated by said intercepters when the latter have been operated.

6. An automatic safety control apparatus of the character described comprising, in combination, a railway vehicle or the like, a signal, a clutch, means operatively connecting said signal and clutch for controlling the latter whereby when said signal is in the "off" position said clutch is disengaged and when said signal is in the "on" or "danger" position said clutch is engaged, a member actuated by said vehicle, said member being operatively connected with one of the elements of said clutch to actuate the same, a controlling device connected with and operated by the other element of said clutch, and apparatus on said vehicle adapted to coöperate with and be controlled by said controlling device when the latter has been operated.

7. An automatic safety control apparatus for railway vehicles and the like comprising, in combination, a clutch, means for controlling the engagement of said clutch, a member actuated by the vehicle, said member being operatively connected with one of the elements of said clutch to actuate the same, an intercepter comprising a casing having a hinged cover and a cam for raising and lowering said cover, said cam being connected with and operated by the other element of said clutch, and apparatus on said vehicle adapted to coöperate with and be controlled by said cover when the latter is raised.

8. An automatic safety control apparatus for railway vehicles and the like comprising, in combination, a clutch, means for controlling the engagement of said clutch, a member actuated by the vehicle, said member being operatively connected with one of the elements of said clutch to actuate the same, an intercepter comprising a casing having a curved, yielding cover and a cam for raising and lowering said cover, said cam being connected with and operated by the other element of said clutch, and apparatus on said vehicle adapted to coöperate with and be controlled by said cover when the latter is raised.

9. An automatic safety control apparatus for railway vehicles and the like comprising, in combination, a clutch, means for controlling the engagement of said clutch, a member actuated by the vehicle, said member being operatively connected with one of the elements of said clutch to actuate the same, a controlling device connected with and operated by the other element of said clutch, a depending pivoted contact member carried by the vehicle and adapted to engage and be actuated by said controlling device when the latter has been operated, mechanism on said vehicle controlled by said contact member, and lever connections between said contact member and said mechanism.

10. An automatic safety control apparatus for railway vehicles and the like comprising, in combination, a clutch, means for controlling the engagement of said clutch, a member actuated by the vehicle, said member being operatively connected with one of the elements of said clutch to actuate the same, a controlling device connected with and operated by the other element of said clutch, a contact member carried by the vehicle and adapted to engage and be actuated by said controlling device when the latter has been operated, automatically operative mechanism on said vehicle for stopping the same, a trigger device for restraining said stopping mechanism and an operative connection between said contact member and said trigger device for releasing the latter.

11. An automatic safety control apparatus for railway vehicles and the like comprising, in combination, a clutch, means for controlling the engagement of said clutch, a member actuated by the vehicle, said member being operatively connected with one of the elements of said clutch to actuate the same, a controlling device connected with and operated by the other element of said clutch, a contact member carried by the vehicle and adapted to engage and be actuated by said controlling device when the latter has been operated, automatically operative mechanism on said vehicle for stopping the same, a trigger device for restraining said stopping mechanism, an operative connection between said contact member and said trigger device for releasing the latter, and means whereby said stopping mechanism and trigger device may be reset after operation thereof.

12. An automatic safety control apparatus for railway vehicles and the like comprising, in combination, a clutch, means for controlling the engagement of said clutch, a member actuated by the vehicle, said member being operatively connected with one of the elements of said clutch to actuate the same, a controlling device connected with and operated by the other element of said clutch, a contact member carried by the vehicle and adapted to engage and be actuated by said controlling device when the latter has been operated, automatically operative mechanism on said vehicle for stopping the same, a trigger device for restraining said stopping mechanism, an operative connection between said contact member and said trigger device for releasing the latter, means whereby said stopping mechanism and trigger device may be reset after operation thereof, and means for recording each resetting operation.

In testimony whereof I have hereunto set my hand in presence of two subscribing witnesses.

JOSEPH JOHN DANIELS.

Witnesses:
 NEVILLE E. BROOKES,
 ERNEST JOHN HILL.